H. J. DAWSON.
TIRE.
APPLICATION FILED MAY 12, 1917.

1,258,879.

Patented Mar. 12, 1918.

Inventor
H. J. Dawson,
By Norman J. Whitaker
Attorney

UNITED STATES PATENT OFFICE.

HARRY J. DAWSON, OF BIRMINGHAM, ALABAMA.

TIRE.

1,258,879.

Specification of Letters Patent.

Patented Mar. 12, 1918.

Application filed May 12, 1917. Serial No. 168,163.

*To all whom it may concern:*

Be it known that I, HARRY J. DAWSON, a citizen of the United States, and resident of Birmingham, in the county of Jefferson and State of Alabama, have invented new and useful Improvements in Tires, of which the following is a specification.

This invention relates to tires and more particularly to that class of tires known as cushion tires.

The primary object of this invention is to provide a tire of the above mentioned type which will possess the advantages of a pneumatic tire in that it is elastic and resilient, but which will avoid the disadvantages of a pneumatic tire in that its elasticity and resiliency are in no wise affected by punctures, blow-outs or the like.

Other objects and advantages will be apparent in the course of the following description, taken in conjunction with the accompanying drawings, and the particular features of novelty will be pointed out in the appended claims.

Figure 1:
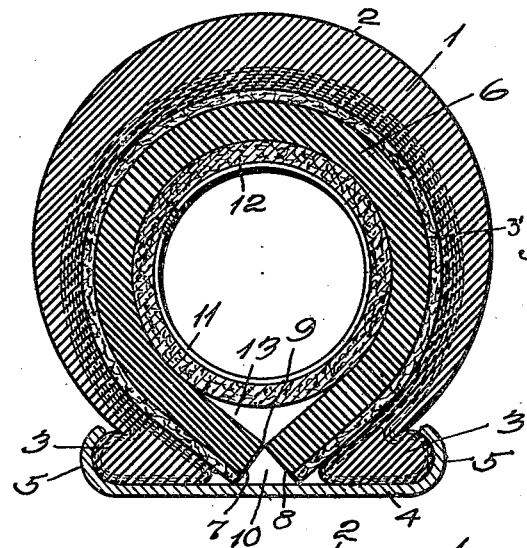
Figure 2:
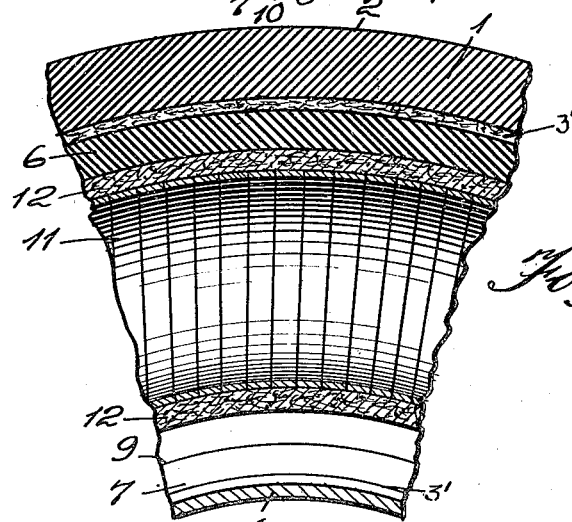
Figure 3:
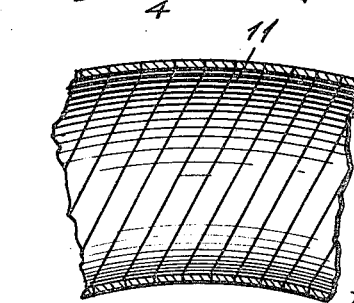

Referring to the drawings, in which similar characters of reference denote similar parts in the views, Figure 1 is a vertical sectional view of the tire applied to the rim of a wheel, Fig. 2 is a longitudinal sectional view of a portion of the tire, and Fig. 3 is a longitudinal sectional view of a portion of the spring used with this invention.

Referring more particularly to the drawings, the tire casing is shown at 1, which may be of any suitable or customary construction. The tire casing 1 is provided with a tread portion 2 and with beads 3. The numeral 4 denotes a wheel rim which is provided with flanges 5 which are adapted to project around the beads 3 of the casing 1.

Positioned within the casing 1 is a rubber cushion 6 which is split longitudinally to form two longitudinal sides 7 and 8. These longitudinal sides 7 and 8 meet at their inner edges 9 and leave between them a triangular space 10. Positioned within the rubber cushion 6 is an endless helical spring 11, the convolutions of which are wound close together. Between the rubber cushion 6 and the casing 1 and extending circumferentially of the casing 1 is an asbestos pad 3' the purpose of which is to prevent the generation of heat due to friction between the casing 1 and the cushion 6.

Between the rubber cushion 6 and the helical spring 11 is positioned a filling 12 which is preferably of asbestos or other heat non-conducting material, so as to prevent the rubbing of the helical spring 11 against the inner face of the rubber cushion 6. The positioning of the spring 11 and asbestos 12, as shown clearly in Fig. 1, leaves an opening 13 between the meeting edges 9 and the filling 12. The positioning of the parts 6, 11 and 12 within the casing 1, it is obvious, will be secure because of the flanges 5 bearing against the beads 3.

From the above description, it can be seen that should a wheel, embodying the invention disclosed herein, strike a large obstacle, thus tending to cause a sudden jar to the vehicle, the tread 2 of the casing 1 will be forced downwardly, thereby forcing the rubber cushion 6 downwardly and the sides 7 and 8 of said cushion 6 will be forced toward each other, thereby allowing a considerable amount of play within the several parts and yet giving full resiliency. The asbestos filling 12 and the spring 11 will be forced against the rubber cushion 6, thereby aiding the movement of the sides 7 and 8 of the rubber cushion.

It is believed from the above description and operation, that the invention will be clear to those skilled in the art to which it appertains, and I desire it understood that various minor changes in the size and proportion of the invention may be made within the scope of the appended claims without departing from the spirit of the invention.

What I claim as new and desire to secure by Letters Patent is,

1. In a tire, an outer casing split longitudinally, a cushion in said casing split longitudinally providing longitudinal sides, the inner edges of which are in contact and the outer edges of which are separated, an endless helical spring in said cushion, and a heat non-conducting filler between said spring and cushion.

2. In a tire, an outer casing split longitudinally, a cushion in said casing split longitudinally providing longitudinal sides, the inner edges of which are in contact and the outer edges of which are separated, an endless helical spring in said cushion, and a heat non-conducting filler between said spring and cushion, the positioning of the filler and cushion normally providing a space between the meeting edges of said cushion and said filler.

3. A tire comprising an outer casing split longitudinally, a cushion in said casing split longitudinally providing longitudinal sides, the inner edges of which are in contact and the outer edges of which are separated, a heat non-conducting pad interposed between said casing and cushion, an endless helical spring in said cushion, and a heat non-conducting filler between said spring and cushion.

HARRY J. DAWSON.